(12) United States Patent
Lundeen (10) Patent No.: US 7,926,483 B2
(45) Date of Patent: Apr. 19, 2011

(54) SYSTEM FOR CONTROLLING PRESSURE IN DEFINED ENVIRONMENT AND ASSOCIATED METHOD

(75) Inventor: James E. Lundeen, Cleveland Heights, OH (US)

(73) Assignee: Sir Issac Newton Enterprises LLC, Cleveland Heights, OH (US)

( * ) Notice: Subject to any disclaimer, the term of this patent is extended or adjusted under 35 U.S.C. 154(b) by 1205 days.

(21) Appl. No.: 11/496,313

(22) Filed: Jul. 31, 2006

(65) Prior Publication Data

US 2006/0264696 A1 Nov. 23, 2006

Related U.S. Application Data

(60) Provisional application No. 60/705,424, filed on Aug. 4, 2005.

(51) Int. Cl.
*A61M 11/00* (2006.01)
(52) U.S. Cl. .............................. 128/202.12; 128/205.26
(58) Field of Classification Search ............ 128/205.11, 128/200.24, 202.12, 205.26
See application file for complete search history.

(56) References Cited

U.S. PATENT DOCUMENTS

| | | | |
|---|---|---|---|
| 4,801,291 A | 1/1989 | Loori | |
| 4,974,829 A | 12/1990 | Gamow et al. | |
| 5,360,001 A | 11/1994 | Brill et al. | |
| 5,398,678 A | 3/1995 | Gamow | |
| 5,462,505 A | 10/1995 | Blair et al. | |
| 5,799,652 A * | 9/1998 | Kotliar | 128/205.11 |
| 6,401,487 B1 * | 6/2002 | Kotliar | 62/640 |
| 6,827,760 B2 * | 12/2004 | Kutt et al. | 95/8 |
| 7,018,443 B2 * | 3/2006 | Kutt et al. | 95/8 |
| 7,059,323 B2 * | 6/2006 | Kullik et al. | 128/202.12 |
| 2004/0154616 A1 * | 8/2004 | Parker Risley et al. | 128/202.12 |

* cited by examiner

*Primary Examiner* — Steven O Douglas
(74) *Attorney, Agent, or Firm* — Renner, Otto, Boisselle & Sklar, LLP (57) ABSTRACT

A system and a method for treating pain in a patient suffering pain are provided. The method may include providing a system inhabitable by the patient in which pressure may be controlled. The patient may suffer from a pain inducing condition associated with a pressure change. The method may also include controlling the pressure of the environment that may be inhabited by the patient to prevent, reduce, or eliminate pressure change. The pain inducing condition may be prevented, reduced or eliminated.

13 Claims, 5 Drawing Sheets

SYSTEM FOR CONTROLLING PRESSURE IN DEFINED ENVIRONMENT AND ASSOCIATED METHOD

CROSS-REFERENCE TO RELATED APPLICATION

This application claims the benefit of U.S. provisional patent application Ser. No. 60/705,424, filed Aug. 4, 2005, the entire disclosure of which is hereby incorporated by reference.

BACKGROUND

1. Technical Field

The present invention relates to apparatus and method for treating a patient toward the end of reducing or eliminating pain or other condition that is related to atmospheric pressure and/or change in atmospheric pressure. The present invention relates also to a method for treating a patient who experiences pain or other condition due to atmospheric pressure or change in atmospheric pressure.

2. Background

Some people are able to sense a weather change in advance of the change, e.g., from a clear weather day to rainy or stormy weather. The sensation may be based on a pain in a body joint, a headache, etc.

Weather induced atmospheric pressure or pressure changes sometimes cause undesirable effects in people exposed to the atmospheric pressure. For example, sinus pain, headaches, pain in a body joint, or even a feeling of malaise may occur in some people in response to atmospheric pressure changes. Other types of pain that is suffered by people include spinal pain and radicular spine pain into an extremity or spinal nerve dermatome including but not limited to the trunk region; and these, two may occur in response to atmospheric pressure changes. The severity of such effect may be from relatively minor discomfort to substantial pain or illness.

Differential pressures have been used for structural support purposes, for example, in undersea structures and in large inflated domes or roofs of athletic fields.

Hyperbaric treatment of patients has been used to treat specific and sometimes undesirable conditions of a patient that may result from a rapid decompression, reduced blood oxygen content, and/or the reduction or elimination of swelling and/or ischemia. An example of such a condition may occur to a scuba diver who swims too quickly to the surface and encounters a condition sometimes referred to as "the bends." Hyperbaric is defined as relating to, producing, operating, or occurring at pressures higher than the normal range of atmospheric pressures. Hyperbaric excludes normal atmospheric pressures which may fluctuate within a wide range of pressures.

A hyperbaric chamber for performing hyperbaric treatment may be a sealed compartment in which the patient may breathe normal air, or air enhanced to be up to about 100% oxygen, while exposed to controlled pressures such hyperbaric treatment equipment is expensive and requires careful control during use; and such equipment is not intended to address incidents due to typical ambient atmospheric pressure conditions and changes, for example about two to three times normal atmospheric pressure.

A standard pressure unit appropriately entitled "Atmosphere", is a unit of pressure equal to the atmospheric pressure at sea level. One Atmosphere equals the amount of pressure that will support a column of mercury 760 millimeters high at 0 degrees Celsius under standard gravity, or 14.7 pounds per square inch ($1.01325 \times 10^5$ pascals). An average pressure exerted by the atmosphere at sea level may be about one kilogram per square centimeter or 101.325 kPa. A pascal (Pa) is a pressure of one newton (the basic unit of force) per square meter. One pound per square inch equals 6.895 kPa and one of inch of mercury equals 3.386389 kPa. Sea-level pressures may be in a range of up to from about 109.70 and 110.50 kPa. Atmospheric pressure drops may occur at a fast rate relative to a rise in atmospheric pressure. A record high atmospheric pressure was measured at 32.01 inches of mercury at Agata in Russia's Siberian region on Dec. 31, 1968. Earth's lowest measured air pressure recorded at sea level was 25.63 inches measured in Supertyphoon Tip on Oct. 12, 1979.

SUMMARY

An aspect of the invention relates alleviating discomfort of a person or an animal that is affected by atmospheric pressure by adjusting or controlling the pressure.

Another aspect relates to a system or apparatus for alleviating discomfort of a person or an animal by adjusting or controlling atmospheric pressure.

Examples of the aforementioned and below mentioned discomfort may be sinus pain, headaches, pain in a body joint, a feeling of malaise, spinal pain and radicular spine pain into an extremity or spinal nerve dermatome including but not limited to the trunk region and possibly other types of pain, discomfort or the like.

Another aspect relates to a system for controlling pressure in an environment defined by at least one of a wall, a floor, and a ceiling, including a blocking structure corresponding to a gas port defined by, extending therethrough, the wall, the floor, or the ceiling, and the gas port being operable to communicate a pressure from the defined environment to ambient atmosphere, wherein the blocking structure is operable to block or reduce a gas flow through the corresponding gas port; and a pressure source communicable with the defined environment that is operable to control a pressure inside the defined environment relative to an ambient atmosphere pressure, which is outside and proximate to the defined environment.

Another aspect relates to a method of treating pain in a person suffering the pain, including placing the person into a controlled environment and adjusting the pressure in that environment.

Another aspect relates to a method for treating pain in a patient suffering pain, including defining an environment inhabitable by the patient in which pressure is controllable, wherein the patient suffers from a pain inducing condition associated with a pressure change; and controlling pressure of the environment that is inhabited by the patient to prevent, reduce, or eliminate pressure change, and the pain inducing condition is prevented, reduced or eliminated.

Another aspect relates to a system operable to prevent, reduce or eliminate pain in a human that suffers from a pain inducing condition, including means for blocking gas flow from a defined environment; and means for controlling pressure in the defined environment.

Another aspect relates to a kit, including a plurality of blocking structures, each blocking structure of the plurality corresponding to at least one gas port, which is operable to communicate a room pressure from a defined environment to ambient atmosphere, each blocking structure being operable to block communication of the pressure through the at least one gas port; and a pressure source in communication with the defined environment that is operable to cause the room pressure to increase pressure, maintain pressure, decrease pressure, or a combination of two or more thereof.

Embodiments of the invention may relate to a system for controlling pressure in a defined environment. The system may include a blocking structure that corresponds to a gas port of a room. The room may have a wall, a floor and a ceiling that define the environment and at least one gas port. The gas port may extend through at least one of the walls, floor or ceiling. The gas port may correspond to at least one of, for example, a door, window, or vent, or a similar orifice. The gas port may communicate a pressure from the room environment to ambient atmosphere. At least one of the blocking structures may block or reduce a gas flow through the corresponding gas port. A pressure source communicates with the room, and may control a pressure inside the room relative to an ambient atmosphere pressure, which is outside and proximate to the room. Engaging the blocking structure to block or reduce the gas flow through the gas port, and engaging the pressure source, which is in communication with the room, may control the pressure relative to the ambient atmosphere pressure.

Embodiments of the invention may relate to a method for treating pain in a patient suffering pain. The method may include providing an environment inhabitable by the patient in which pressure is controllable. The patient may suffer from a pain inducing condition associated with a pressure change. The method may also include controlling the pressure of the environment that may be inhabited by the patient to prevent, reduce, or eliminate pressure change. The pain inducing condition may be prevented, reduced or eliminated.

Other embodiments of the invention are disclosed. One embodiment of the invention relates to a kit. The kit may include a plurality of blocking structures. Each blocking structure may correspond to at least one gas port. The gas port may communicate a room pressure from a defined environment to ambient atmosphere outside of the defined environment. Each blocking structure may block communication of the pressure through the corresponding gas port. The kit may further include a pressure source in communication with the defined environment that may cause the room pressure to increase pressure, maintain pressure, decrease pressure, or a combination of two or more thereof.

To the accomplishment of the foregoing and related ends, the invention comprises the features hereinafter fully described and particularly pointed out in the claims. The following description and the annexed drawings set forth in detail certain illustrative embodiments of the invention. These embodiments, however, are merely indicative of a few of the various ways in which the principles of the invention may be employed. Other objects, advantages and novel features of the invention will become apparent from the following detailed description of the invention when considered in conjunction with the drawings.

Although the invention is shown and described with respect to one or more preferred embodiments, it is obvious that equivalents and modifications will occur to others skilled in the art upon the reading and understanding of the specification. The present invention includes all such equivalents and modifications, and is limited only by the scope of the claims. It also will be appreciated that although the invention is described with respect to several embodiments, features of a given embodiment also may be used with one or more other embodiments.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified.

DETAILED DESCRIPTION

Figure 1:
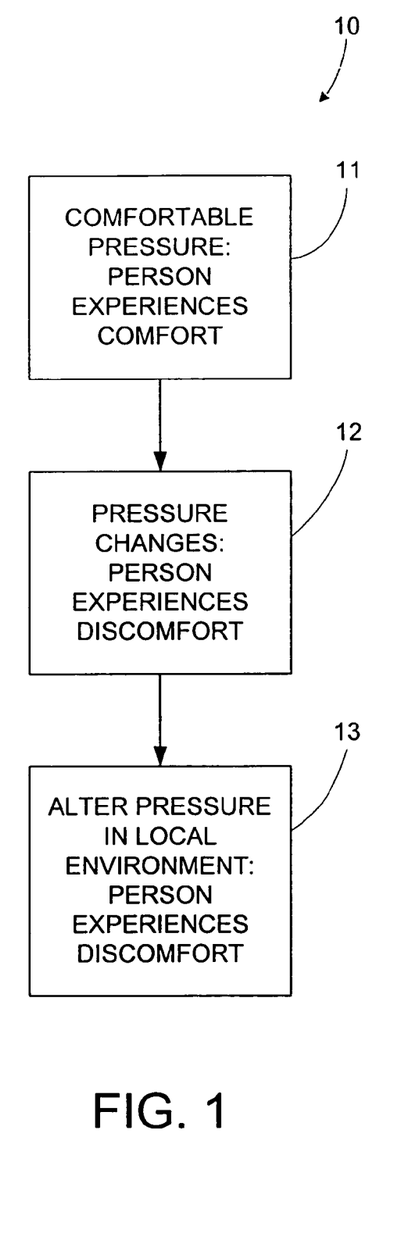
FIG. 1 is a schematic block diagram illustrating an embodiment of the invention.

Referring, now, to the drawings wherein like reference numerals designate like parts in this several figures, and initially to FIG. 1, a schematic block diagram illustrating an embodiment of the invention is shown at 10. In an ambient environment in which a person experiences a comfortable ambient atmospheric pressure the person may be relatively comfortable, as is represented at block 11. However, in the event of a change in the atmospheric pressure, as is represented at block 12, the person may experience discomfort. For example, the discomfort may be manifest in an ache or pain in a body joint, a headache, a sinus headache, even a general feeling of malaise, spinal pain and radicular spine pain into an extremity or spinal nerve dermatome including but not limited to the trunk region, and the extent of that discomfort may be different for different individuals and may depend on the actual ambient atmospheric pressure in the environment of the individual. To alleviate the discomfort, the ambient atmospheric pressure may be altered according to the invention as is illustrated in block 13. As but one example of use of the invention, a person who is sensitive to atmospheric pressure may feel quite comfortable on a fair weather day. However, in many instances prior to weather changing from fair to rainy or stormy, the atmospheric pressure may decrease, and that decreased atmosphere pressure may cause discomfort to the person. By changing the atmospheric pressure in the local environment of the person from the relatively lower pressure to one that is more comfortable, the overall comfort level of the individual may be improved. By maintaining the atmospheric pressure in a local environment as the pressure outside that environment changes, the comfort level also may be maintained in such local environment.

Figure 2:
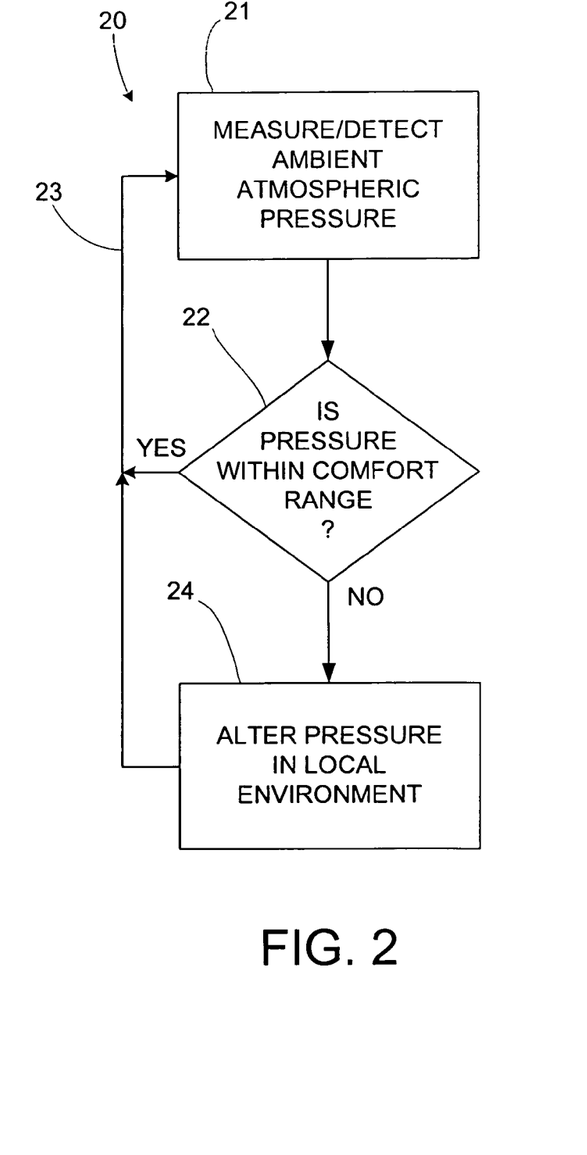
FIG. 2 is a schematic block diagram illustrating a method in accordance with an embodiment of the present invention.

Turning to FIG. 2, an example of a method embodying the invention is illustrated in the block diagram 20. At block 21 ambient atmosphere of pressure is measured or detected, e.g., by a barometer type device. At block 22 an inquiry is made whether the pressure is within a comfort range, for example, at one atmosphere as is mentioned above or at some other pressure or range of pressures at which an individual feels relatively comfortable. Feeling relatively comfortable may be somewhat subjective and dependent on the individual, the sensitivity of the individual to atmospheric pressure, the pain tolerance level, e.g., headache pain, sinus or sinus headache pain, or joint pain of the individual, etc. If the pressure is within the comfort range at block 22, then the method follows a loop line 23 back to block 21, and the process of blocks 21 and 22 may be repeated from time to time either continuously, on a periodic basis, etc. If at block 22 the pressure is not within the comfort range, then the method flows to block 24 at which an alteration may be made in the atmospheric pressure in the local environment in which the person who is experiencing discomfort is located. After such alteration is made at block 24, the loop line 23 is followed back to block 21 and the method exemplified by the illustration at 20 in FIG. 2 is continued.

The steps illustrated in the method 20 of FIG. 2 may be carried out using pressure detectors or sensors, such as a barometer as was mentioned above, using a computer or other electronic equipment to compare values of detected atmospheric pressure and a standard or pre-set pressure level as to determine whether the ambient atmospheric pressure is within a comfort range, and suitable computer or electric equipment to control alterations in pressure in a local environment. An exemplary computer or electronic system for such purposes may include a conventional personal computer, specially designed computer or computer circuitry, special sensors, etc., and suitable computer program software to carry out the various steps described herein. Other possibilities also currently are available and may become available in the future to effect such detection, measurement, control, adjustment, etc. as will be evident to those persons who have ordinary skill in the art. Furthermore, appropriate adjustments may be provided to a user of the invention to set pressure levels, ranges, zones, etc. and to control the alterations in pressure in the local environment or the extent that such alterations are made and/or the speed at which alterations are made.

In the following description with reference to FIGS. 3-5 several examples of systems and methods of the invention are described in further detail.

Using the present invention it is possible to control pressure in a defined environment to the benefit of a person (also sometimes referred to herein as patient, individual, etc.) to alleviate a discomfort due to ambient atmospheric pressure condition, change, or rate of change. Examples of such discomfort may be sinus pain, headaches, sinus headaches, joint pain, a general feeling of malaise, spinal pain and radicular spine pain into an extremity or spinal nerve dermatome including but not limited to the trunk region etc.

Pressure tendency sometimes may be referred to as barometric tendency, and is the rate of change of atmospheric or ambient pressure within a specified period of time, for example, measured in three hour intervals or some other interval. Pressure (sometimes used herein at a short form for atmospheric or barometric pressure) is the amount of force acting on a unit surface area, for example, on the patient.

Figure 3:
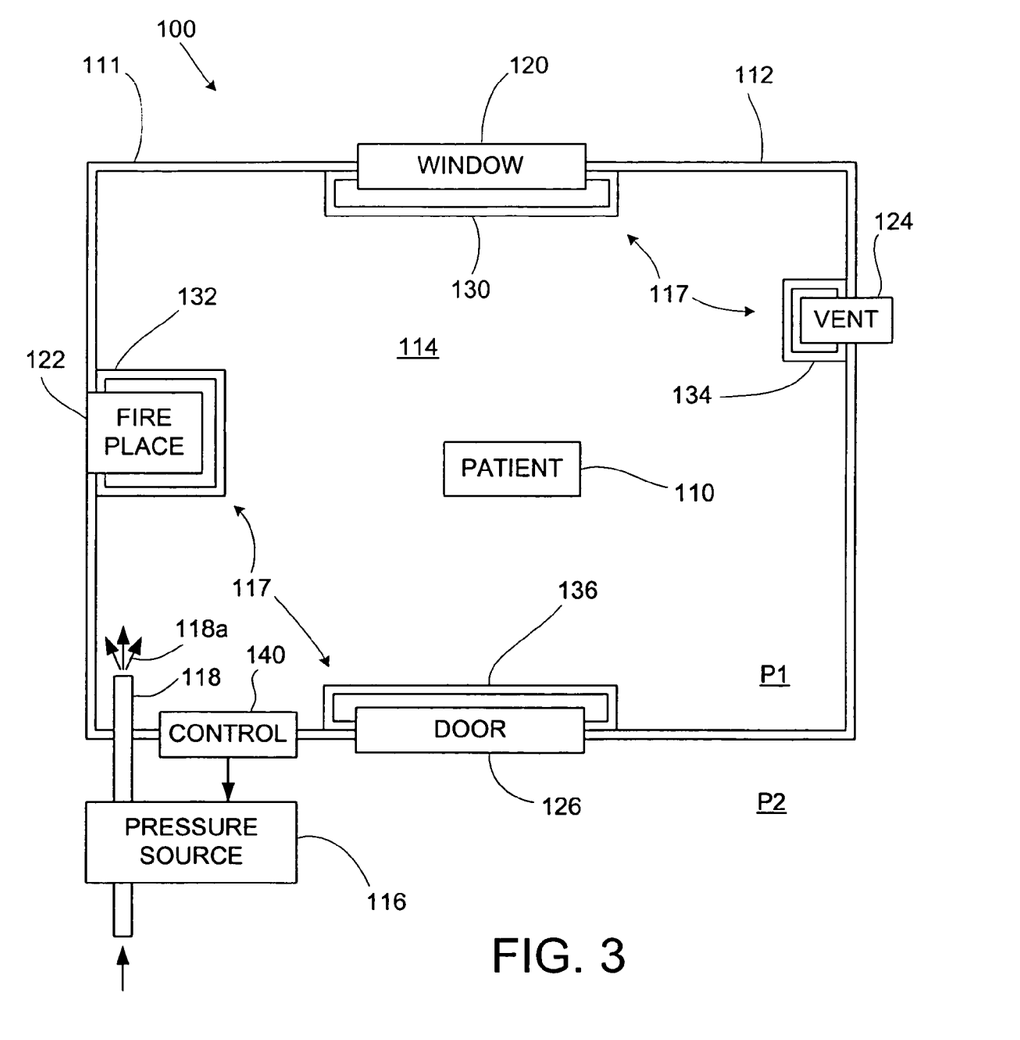
FIG. 3 is a schematic diagram showing a first system comprising an embodiment of the present invention.

A system 100 that exemplifies an embodiment according to the present invention is shown in FIG. 3. The system 100 may be suitable for use with, or in the modification of, a common general purpose structure, such as a house or an office building. FIG. 3 illustrates a top plan view of the system 100 engaged in a room 101 of a typical house, office suite, etc. In the illustrated case, the room includes a set of four walls 112, a floor 114 and a ceiling (not shown for clarity). The room defines the environment to be controlled and distinguishes the room environment from the external ambient atmosphere. That is, the initial pressure in a room may be thought to have a pressure that is about the same as the pressure outside of the room ($P_{room} = P_{outside}$). The engagement or use of the system 100 may enable the room pressure (P1) to differ from the outside ambient atmospheric pressure (P2) in a predetermined manner. A patient 110 may be situated in the room, as shown, and therefore subject to pressure P1, rather than P2.

The system 100 includes a pressure source 116, and a plurality of blocking structures generally indicated at 117. The blocking structures tend to prevent or to block leakage of air from the room 101, for example, when the pressure source 116 is engaged or has been engaged to increase atmospheric pressure, e.g., air pressure in the room. The pressure source 116 may be a commercially available diaphragm air pump, a rotary air pump, a pressurized vessel or tank, a chemical gas generator, and the like, and combinations of two or more thereof. In the illustrated embodiment, the pressure source 116 is a diaphragm pump that is disposed outside of the room. The pressure source 116 includes tubing, ducts, etc. 118 that communicates the pump with the interior of the room.

The number and form of blocking structures 117 in a system 100 may depend on the characteristics of the room 111, e.g., size, shape and number of doors, windows, vents, etc., each of which sometimes may be referred to below as a gas part. If, for example, the room 111 had only one opening, a door, for instance, then only a single blocking structure would be needed to engage all of the openings in that room. Further, the configuration and composition of blocking structures may differ from system to system as the blocking structures may correspond to different gas ports. In one embodiment, the blocking structures may be initially the same or similar to each other, but may be modifiable during installation or use. In such an embodiment, the blocking structures may be customized to fit and/or seal gas ports. Some of the blocking structures may differ in that they may include one or more device such as a one-way air valve, a manually controllable air valve, a filter, a sealable orifice through which structures, such as wires, may be passed, and the like, and combinations of two or more thereof.

Gas ports may be openings, orifices, entrances, exits, ingress/egress portals, windows, vents, doors, gas porous walls, ceilings and floors, skylights, wall outlets and switches, and the like, and combinations of two or more thereof (collectively referred to as "gas ports"). Referring again to the illustrated embodiment in FIG. 3, four gas ports are shown: a window 120, a fireplace 122, a vent 124, and a door 126. Each of the gas ports 120, 122, 124 and 126 extends through a wall 112 from inside the room to outside the room.

The exemplary illustrated system 100 includes four blocking structures or seals, one corresponding to each of the gas ports 120, 122, 124 and 126. Particularly, a window blocking structure 130 corresponds to the window 120, a fireplace blocking structure 132 corresponds to the fireplace 122, a vent blocking structure 134 corresponds to the vent 124, and a door blocking structure 136 corresponds to the door 126.

With reference to the blocking structures 130, 132, 134, and 136, the form of the variety of blocking structures is influenced or controlled by the form, shape and function of the gas port to which it is to correspond. Accordingly, the blocking structures 130, 132, 134, and 136 described herein are examples of blocking structures that may be suitable to fit and/or to engage corresponding gas ports 120, 122, 124 and 126. The window blocking structure 130 corresponds to the window 120, as noted above. Some useful characteristics of the window blocking structure 130 may include, for example, transparency or opacity, flexibility, and a size and shape that generally corresponds to the window 120. In one embodiment, the window blocking structure 130 may be a polymer film, positionable on the inside (illustrated) or outside (not shown) of the window 120. In one embodiment, the window blocking structure 130 may include metal, wood, structural composite, glass, and the like, and combinations of two or more thereof. In one embodiment, the existing window 120 is modified and/or sealed with caulk, adhesive, glue, rubber, mortar, and the like and combinations of two or more thereof, and in this case such window may be the blocking structure without the need for a separate blocking structure.

In one embodiment, the width and height of the window blocking structure 130 may be larger than the window 120 to completely overlay the window 120, and have selvage to secure to the wall portion adjacent to the window 120. A transparent polymer film or sheet may be suitable for use with this embodiment. Suitable polymer films may include polypropylene, polyethylene, polyvinyl, and the like, and combinations of two or more thereof. For suitable polymer sheets, the sheet may include polypropylene, polyethylene, polyvinyl, polycarbonate, and the like, and combinations of two or more thereof.

In one embodiment, the window blocking structure 130 may include a securing system (not shown). Suitable securing systems may include an adhesive operable to secure the polymer film or sheet to the wall 112, hook and loop fasteners, clips, screws, snaps, male/female connectors, magnet/magnetic combination fasteners, other fasteners, and the like, and combinations of two or more thereof. Suitable adhesive securing systems may include both adhesives and tape adhesives, and may be pressure sensitive adhesive, structural adhesives, and/or hot melt adhesives.

During use, the blocking structures 130, 132, 134, and 136 block or reduce the flow path of gas (in this embodiment the gas is air) from inside the room to the outside. In one embodiment, in a system 100 the blocking structures may be operable so that the gas flow from inside the room 111 P1 to outside P2 is reduced, and the constriction or restriction may create the pressure differential. In one embodiment, the gas flow may be completely blocked. In one embodiment, some blocking structures may reduce the flow of gas, and others may block the flow of gas. Each of the gas ports 120, 122, 124 and 126 may be fitted with a corresponding and suitable blocking structure.

The pressure source 116 may be engaged to pump air from outside the room 111 to the inside of the room, as is indicated by the directional arrows 118a at the duct 118. Because the flow of air out through the gas ports or openings 120, 122, 124 and 126 is restricted, reduced or blocked, the pressure P1 in the room 111 increases relative to the ambient atmospheric pressure P2. The patient is thus subject to the increased room pressure P1, rather than the ambient atmospheric pressure P2.

A control 140 is illustrated in FIG. 3. The control 140 may be a manual control that may be set by a user (e.g., a patient or other individual) to determine the operation of the pressure source 116 to achieve a desired pressure in the room 111, a desired pressure change, etc. The control 140 may be a simple digital control, an adjustable potentiometer in a bridge circuit, or some other control. The control 140 may include a timer to determine and/or to limit the time of operation of the pressure source 116. The control 140 may be a computer or an electrical or electronic control. The control 140 is shown in FIG. 3 located to be accessible from both inside and outside the room 111, although it may be placed in and be accessible from only one or the other of those locations. The same or similar control may be used in other embodiments illustrated, for example, in FIGS. 4 and 5 (see reference numerals 140' and 140" described below).

Figure 4:
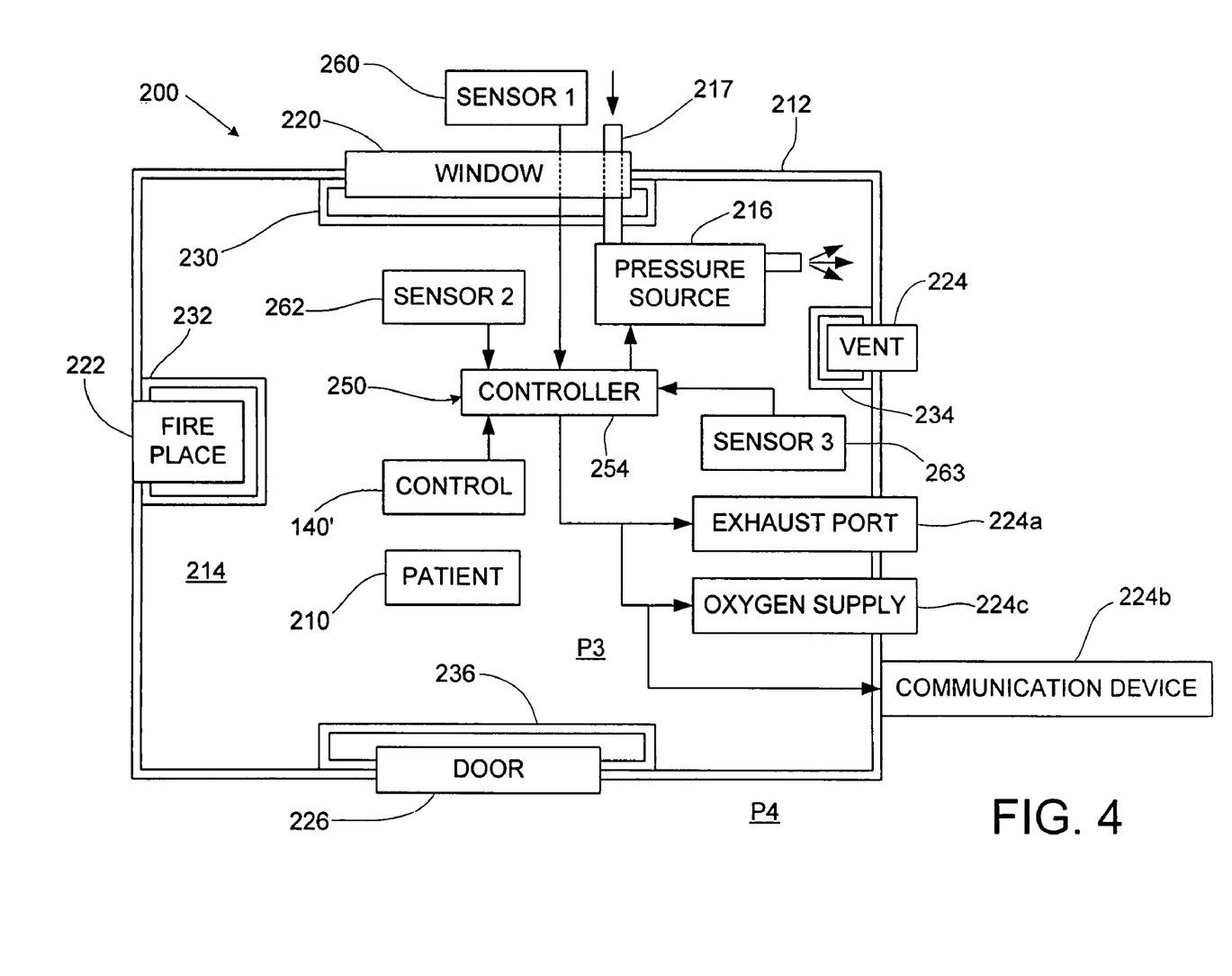
FIG. 4 is a schematic diagram showing a second system comprising another embodiment of the present invention.

A system 200 shown in FIG. 4 illustrates another embodiment or example of the invention. As illustrated in FIG. 4 in top plan view, the room 211 includes a set of four walls 212, a floor 214, and a ceiling (not shown for clarity). The engagement of the system 200 may enable the room pressure (P3) in the room to differ from the outside ambient atmospheric pressure (P4) in a predetermined manner. A patient 210 may be situated in the room, as shown, and, therefore, subject to pressure P3, rather than P4.

In this embodiment and the other embodiments described herein the room pressure may be maintained at an increased pressure relative to the external, ambient pressure, but in some situations it may be desirable to have the reverse effect. That is, the pressure in the room may be maintained at a relatively lower pressure than the external, atmospheric pressure.

The room 211 has openings or gas ports that extend through the wall 212 from inside the room to the outside of the room. The illustrated exemplary gas ports include a window 220, fireplace 222, vent 224, and a door 226. While the room may have many other different and/or additional openings or gas ports, the gas ports 220, 222, 224, and 226 illustrated may be suitable for use in a dwelling.

The system 200 includes blocking structures substantially similar to the blocking structures described with reference to FIG. 3. The illustrated system 200 includes blocking structures 220, 222, 224, and 226 that correspond to the gas ports 210, 212, 214, and 226, respectively. A control system 250 and a pressure source 252 are included in the system 200.

The control system 250 may include a controller 254, and a plurality of sensors 260, 262, for example, that communicate with the controller 254. In the illustrated embodiment, the controller 254 communicates with sensors 260, 262. The first sensor 260 is disposed outside of the room 211, and the second sensor 262 is disposed within the room. While the sensors 260, 262 may be configured to sense one or more conditions, such as temperature, humidity, air quality, contamination content, and the like, the sensors 260, 262 at least may measure pressure and/or pressure change. Pressure change may be measured by using a computer or other device to compare the pressures sensed by a sensor at different times. Suitable sensors are commercially available. Contamination content may include ozone, dust, sulfurous contaminates, nitrogen-based contaminates, organic solvents, and the like, and combinations of two or more thereof, and/or hazardous air pollutants (HAPs) generally. The sensors 260, 262 also are operable to communicate the information about the sensed measurements, e.g., pressure readings, to the controller 254. In one embodiment, the communication may be also two-way between the sensors 260, 262 and the controller 254. The communication may be accomplished using a wire, a wireless communication method, and/or other suitable communication means. The communication may be direct from sensor to controller, or may be indirect, such as through a receiver and/or computer system. In an alternative embodiment, the controller may communicate through the internet and may access the sensor data, and/or meteorological data from a website that may provide such data. The controller 254 may be an interface circuit between the sensors 260, 262 and a computer or may itself be a computer.

Since the room or enclosure in which the pressure is to be maintained or adjusted may be small relative to the size and or number of living creatures therein, it is also may be necessary and/or desirable to have an exhaust portal feature or option. An example of such an exhaust port is illustrated schematically at 224a in FIG. 4. The exhaust port may be one of the other possible ports, such as, for example, the vent 224. Opening and closing of the exhaust port 224a may be carried out by an appropriate controller, e.g., controller 254, in response to sensing of a given condition in the environment, e.g., in the room 214 or other environment. Non-limiting examples of such given conditions are described just below. Such sensing may be carried out by a sensor 263 or by one of the other sensors described herein. Appropriate motive mechanism, e.g., a stepper motor or some other motor, solenoid, etc. or some other device may provide the effort to open and/or to close the exhaust port 224a in response to control by the controller 254, for example. However, if there is sufficient general leakage of gases into the walls, under doors, around windows, etc., a separate exhaust port 224a may not be required. If one or more persons and or one or more domestic pets will inhabit the controlled environment, e.g., the room 214 or some other controlled environment, for extended periods of time, then the exhaust port 224a and sensor 263 and/or 260, 262 may be used to sense conditions in the environment. Exemplary sensors may be gas sensors for oxygen, carbon monoxide and/or carbon dioxide, and they may be coupled to the controller 254 to operate the exhaust port 224a (or other vent, etc.) and/or the sensor(s) may be coupled to an alarm or other signaling system and/or communications system 224b. The alarm or other signaling system and/or communications system may be used to provide notification of the condition to person(s) within the environment and/or to person(s) outside the environment, e.g., appropriate authorities (police, fire department, etc.). If a sensor detects a condition such as a reduced oxygen level in the environment, the sensor may signal the appropriate controller to flood the environment with suitable oxygen supply, e.g., high grade oxygen, an example of which is shown at 224c.

The pressure source 216 may have portions that are substantially similar to parts of the pressure source 116 described with reference to FIG. 3. The pressure source 226 may be disposed within (as is illustrated) or outside the room 211, and may include tubing 217 that communicates with the outside atmosphere. The tubing may extend through a wall 212 or one of the gas ports, or through an aperture defined in the wall 212 to accommodate the tubing. The pressure source 216, if a pressurized tank, gas generator, or the like, may not need tubing. Thus, for some embodiments, tubing may be optional or unnecessary. In one embodiment, the pressure source 216 may include one or more additional features, such as a heater, a cooler, a humidifier, a dehumidifier, a filter, an aromatherapy odor source, a sterilizer unit, an oxygen source, and the like. These features may allow a user to affect an air flow into the defined environment. Suitable filters may include general dust filters, high performance particulate filters, HEPA filters, carbon and activated carbon filters, acid neutralizers, charged or ionic filters, biological agent filters, chemical agent filters, ozone scrubber filters, and the like, and combinations of two or more thereof. Suitable sterilizer units may include peroxide generators or sources, ultraviolet (UV) light sources, bactericides, chlorine-bearing materials, iodine-bearing materials, silver-bearing materials, and the like, and combinations of two or more thereof. Suitable oxygen sources may include pressurized oxygen, oxygen generators, and the like, and combinations of two or more thereof.

During use, the controller 254 receives pressure information from the sensors 260, 262. The controller 254 may monitor the pressure information while pressure P3 (inside)=pressure P4 (outside). When the pressure P4 begins to drop (from $P4_{initial}$ to $P4_{subsequent}$), and the sensor 260 communicates the pressure reading to the controller 254, the controller 254 controls the pressure source 216 to add air and thereby increase or maintain the pressure P3 in the room, which might otherwise follow pressure P4 downward. The sensor 262 senses pressure P3 inside the room 211. In one embodiment, from the pressure information provided by the sensors 260, 262 the controller 254 controls the pressure source 216 so that the pressure P3 remains about the same or constant despite the drop in pressure P4 outside. In one embodiment, the controller 254 may then control the pressure source 254 to reduce outputting air or gas at a predetermined rate. The room pressure P3 may then move downward (from $P3_{initial}$ to $P3_{subsequent}$) until pressure $P3_{subsequent}$ is about the same as the new, lower pressure $P4_{subsequent}$, but the rate of change of pressure in the room is controlled to be at a predetermined rate. In one embodiment, the predetermined rate of change from initial pressure P3 to subsequent pressure P3 is slower than the rate of change for pressure P4. A suitable computer program can be prepared in a reasonable period of time by a person who has ordinary skill in the art to operate the controller 254 to receive pressure information from the sensors 260,262, and to operate the pressure source 216 in a desired manner, for example, as is described herein or in some other way to control, to adjust, to maintain, to increase, to decrease, etc. pressure in the room 211 or in some other determined environment, for example, for the comfort of a user or for some other reason.

Figure 5:
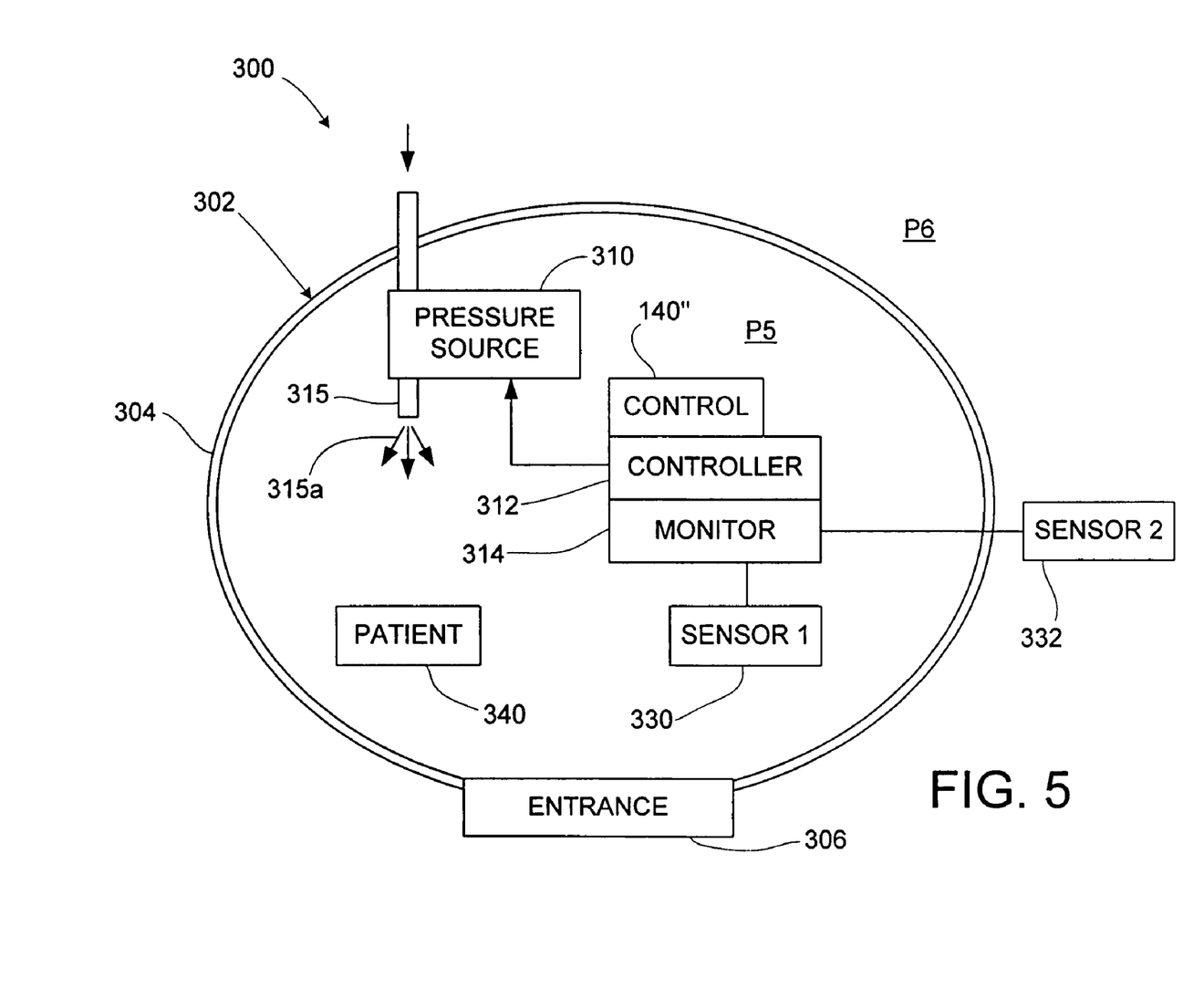
FIG. 5 is a schematic diagram showing a portion of a system comprising an embodiment of the present invention.

FIG. 5 shows a sealing system 300 embodiment according to the present invention. The system 300 includes a substantially impermeable shelter structure 302 that may be structurally supported by a pressure differential relative to atmospheric pressure. The system 300, or portions thereof, may include or may be used in conjunction with systems, or portions thereof, of other embodiments of the invention, such as the systems 100 and 200 described hereinabove. The shelter structure 302 may include a barrier portion 304 that may prevent, reduce or eliminate the passage of gas, such as air, therethrough, and an entrance 306, which allows ingress and egress to the interior environment of the shelter structure 302. The entrance 306 is resealably securable using fasteners and/or a fastener system, suitable seals, e.g., as in an air lock type device, etc. The system 300 also includes a pressure source 310, a controller 312, and a monitor 314.

In the illustrated embodiment, the controller 312 and the monitor 314 may be co-housed. The monitor 314 may include one or more sensors. In the illustrated embodiment, the monitor communicates with internal SENSOR 1 (330) and external SENSOR 2 (332). The sensors 330, 332 may be substantially similar to the sensors described above; the sensors 330, 332 may sense pressure and communicate information regarding pressure to the monitor 314. The monitor 314 may communicate the pressure information to the controller 312.

The controller 312 may then control the pressure source 310 to bring air from outside to inside the shelter structure 302 via a duct or pipe 315, as is indicated by directional arrows 315a. By bringing in air, the pressure P5 inside the environment increases relative to the pressure P6 outside the environment. Alternatively or additionally, the pressure P5 is maintained at a substantially constant level relative to the pressure P6, which may fluctuate, for example, decrease. In another embodiment, the controller 312 may be functional to gradually equalize the pressures P5 and P6. In one embodiment, the environment defines a room inhabitable by a patient 340, e.g., at a predetermine rate.

In one embodiment, the system 300 is self supporting. The system 300 may be self supporting because of, for example, a maintained interior pressure (pressure-supported) and/or rigidity of materials (material supported). In one embodiment, the system 300 may be supported by support structures (not shown) that hold or maintain the barrier portion 304 in place. The sides of the barrier portion 304 may be held by wall poles (not shown), the floor may be held down by weights (not shown), and the ceiling may be held up against the ceiling by ceiling poles (not shown). Alternative and/or additional support may be provided by adhesives, fixtures, fasteners, and the like, and combinations of two or more thereof.

In using the several systems 100, 200, 300 pressure in an environment that is partly separated from another environment, e.g., external ambient, is able to be adjusted, controlled, etc., either automatically or manually to the comfort advantage of a patient user, etc.

Figure 6:
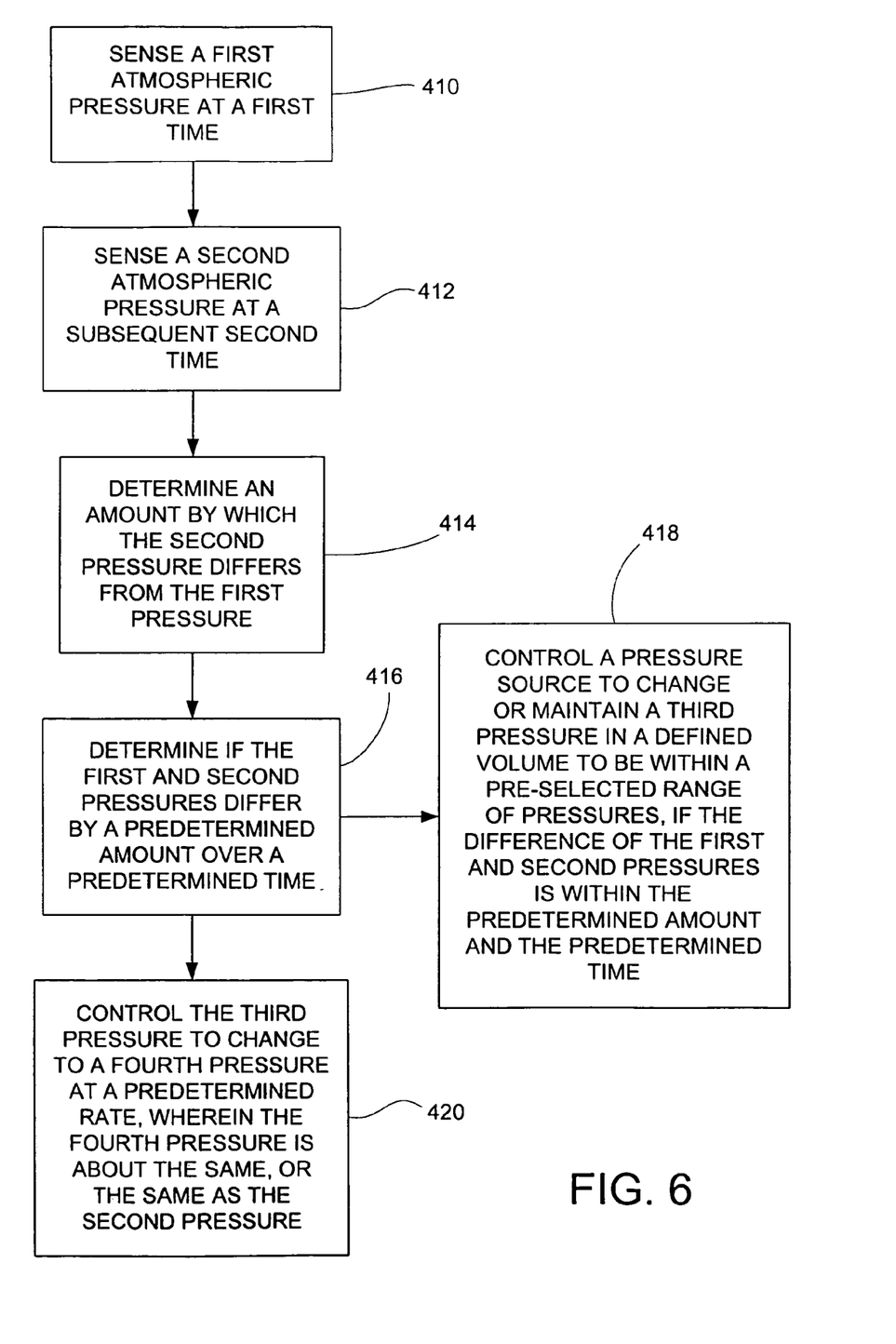
FIG. 6 is a block diagram showing a method comprising an embodiment of the present invention.

With reference to FIG. 6, a block diagram 400 shows an exemplary method according to embodiments of the present invention. The illustrated method includes sensing a first pressure at a first time (step 410) and sensing a second pressure at a second time (step 412). The first and second pressures may be compared to determine if a pressure change has occurred (step 414). A rate of pressure change may be calculated using the difference in pressure over the time lapse between the first and second time. Optionally, the amount of the pressure change, the rate of change, or both, may be compared to a predetermined list or value(s) to determine if the amount or the rate is sufficient to act on (step 414). A pressure source may be controlled to adjust a pressure (third pressure) in a defined volume, such as a room, to be within a selected range of pressures (step 416). In one embodiment, the pressure source is controlled to maintain a pressure (third pressure) in the defined volume at the pressure that was initially sensed in step 410 (step 418). By countering a sudden pressure drop in the defined volume with the increased relative pressure the system may maintain the increased pressure. Thus, a patient disposed in the defined volume having a maintained increase pressure may forego experiencing the pressure drop indefinitely. If the patient responds to sudden drops in pressure by experiencing discomfort, then the patient (while disposed in the defined volume and under constant, rather than fluctuating, pressure) also forgoes the suffering of pain, discomfort and the like that may accompany such a change.

Alternatively and/or additionally, the third pressure in the defined volume may be controlled to change to a fourth pressure at a predetermined rate, wherein the fourth pressure is about the same, or the same, as the second pressure (step 420). It may sometimes be the case that a patient suffers from discomfort and/or pain caused by a pressure change, sometimes a pressure drop, more due to the rate of change in the pressures than due to an absolute level of pressure. Accordingly, control of the rate of change may allow the patient to seek shelter in a pressure-controlled environment, such as disclosed herein, during weather changes accompanied by pressure changes of a high or an unusually high rate of change. The pressure in the defined volume may then be equilibrated with the outside pressure at a rate controllable by or for the patient. The controlled rate may be more gradual than the rate of change induced by the weather, for example. Thus, any suffering the patient might be subject to in response to rapid rate changes may be mitigated, reduced and/or eliminated.

In one embodiment, a method may include exposing a patient suffering from pain and aches related to drops in the barometric pressure to a relatively increased pressure environment. The external or outdoor barometric fluctuations may be controlled and/or avoided so that resultant pain may be reduced and/or avoided.

In one embodiment, the pressure differential between the defined environment, or room interior, and the atmospheric pressure external of the defined environment may be controlled to be in a range of from about greater than 0 kPa to about less than 2000 kPa. In another embodiment, the pressure differential may be in a range of from about greater than 0 kPa to about less than 1000 kPa, or from about 1000 kPa to about 2000 kPa. In another embodiment, the pressure differential may be in a range of from about greater than 0 kPa to about less than 100 kPa, from about 100 kPa to about 200 kPa, from about 200 kPa to about 300 kPa, from about 300 kPa to about 400 kPa, from about 400 kPa to about 500 kPa, from about 500 kPa to about 600 kPa, from about 600 kPa to about 700 kPa, from about 700 kPa to about 800 kPa, from about 800 kPa to about 900 kPa, or from about 900 kPa to about 1000 kPa. In yet another embodiment, the pressure differential may be in a range of from about 5 kPa to about 10 kPa, from about 10 kPa to about 20 kPa, or from about 20 kPa to about 50 kPa. Here and elsewhere, range limitations may be combined and/or interchanged. In one embodiment, a pressure differential as disclosed above may be an increase from atmospheric pressure, or a decrease from atmospheric pressure, in the defined environment. Alternatively, a pressure differential as disclosed above may result from maintaining a room pressure in the defined environment, while the atmospheric pressure changes (e.g., rises or falls). In one embodiment, the controlled barometric or pressure tendency inside may lag at a predetermined rate relative to the environmental pressure tendency outside.

The processes and embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems and methods that do not differ from the literal language of the claims, and further includes other structures, systems and methods with insubstantial differences from the literal language of the claims.

What is claimed is:

1. A method for treating pain in a patient suffering pain, comprising:
   defining an environment inhabitable by the patient in which pressure is controllable, wherein the patient suffers from a pain inducing condition associated with a pressure change; and
   controlling pressure of the environment that is inhabited by the patient to prevent, reduce, or eliminate pressure change, and the pain inducing condition is prevented, reduced or eliminated,
   wherein the controlling pressure of the environment comprises increasing pressure in the defined environment when the ambient pressure decreases as to cause pain or discomfort experienced by the patient.

2. The method as defined in claim 1, further comprising controlling the pressure in the defined environment to be maintained at a pressure that is in a predetermined range of pressures.

3. The method as defined in claim 1, further comprising controlling the pressure in the defined environment to change to be about the same or the same as the ambient pressure that existed prior to a pressure drop in the ambient pressure.

4. The method as defined in claim 3, wherein the pressure in the defined environment is controlled to change at a predetermined rate.

5. The method as defined in claim 1, further comprising sensing at least one of the atmospheric pressure or a change in the ambient pressure.

6. The method as defined in claim 5, further comprising controlling the pressure in the defined environment in response to the sensed pressure change.

7. The method as defined in claim 6, further comprising controlling the pressure in the defined environment to switch from an initial pressure that is about the same as the initial atmospheric pressure to a pressure that is about the same as a subsequent atmospheric pressure while controlling the rate of change of pressure in the defined environment.

8. The method as defined in claim 1, wherein the step of defining the environment comprises engaging gas ports with corresponding blocking structures.

9. The method as defined in claim 1, wherein the step of controlling the pressure comprises engaging a pressure source that is in communication with the defined environment.

10. The method as defined in claim 9, wherein the step of engaging the pressure source further comprises affecting a flow of air by heating, cooling, humidifying, dehumidifying, filtering, or sterilizing, or a combination of two or more thereof.

11. The method of claim 1, wherein the controlling pressure of the defined environment that is inhabited by the patient comprises controlling the pressure to prevent, reduce or eliminate a pain in at least one of a body joint, spine, body extremity, spinal nerve dermatome, head or sinus of the patient.

12. The method of claim 1, wherein said controlling comprises treating pain by regulating barometric pressure in the defined environment.

13. The method of claim 12, wherein said regulating comprises regulating in a room of a building.

* * * * *